US006745660B2

(12) United States Patent
Caputo

(10) Patent No.: US 6,745,660 B2
(45) Date of Patent: Jun. 8, 2004

(54) APPARATUS FOR CUTTING BAKED GOODS AND METHOD OF USE

(76) Inventor: Mary L. Caputo, 916 S. Philadelphia St., Anaheim, CA (US) 92805

( * ) Notice: Subject to any disclaimer, the term of this patent is extended or adjusted under 35 U.S.C. 154(b) by 283 days.

(21) Appl. No.: 09/956,454

(22) Filed: Sep. 18, 2001

(65) Prior Publication Data

US 2003/0051589 A1 Mar. 20, 2003

(51) Int. Cl.[7] ............................................. A21C 15/04
(52) U.S. Cl. ............................. 83/761; 83/614; 99/537
(58) Field of Search ......................... D7/673, 672, 677; 83/761, 762, 763, 764, 614, 565, 823; 30/286, 289, 293, 290, 313, 317; 99/DIG. 15, 515, 537; 220/573.4, 4.22, 4.29, 912

(56) References Cited

U.S. PATENT DOCUMENTS

| | | | | | |
|---|---|---|---|---|---|
| 892,552 | A | | 7/1908 | Rexer | |
| 1,097,367 | A | * | 5/1914 | Sabin | 99/433 |
| 1,827,062 | A | * | 10/1931 | Austin | 99/433 |
| 2,136,552 | A | * | 11/1938 | Le Page | 28/152 |
| 2,371,234 | A | * | 3/1945 | Fay et al. | 99/433 |
| 2,434,566 | A | | 1/1948 | Hulsmann | |
| 2,487,234 | A | | 11/1949 | Gore | |
| 2,570,060 | A | * | 10/1951 | Johnson | 99/324 |
| 2,598,789 | A | * | 6/1952 | Harrell | 99/645 |
| 2,730,801 | A | * | 1/1956 | Deedman et al. | 30/114 |
| 3,075,565 | A | | 1/1963 | Weaver et al. | |
| 3,132,678 | A | | 5/1964 | Steketee | |
| 3,727,508 | A | | 4/1973 | Haapala | |
| 3,800,372 | A | * | 4/1974 | Daoust | 28/152 |
| 4,416,040 | A | * | 11/1983 | Towsley | 28/152 |
| 4,648,300 | A | | 3/1987 | Hassenfelt, Jr. | |
| 4,939,968 | A | * | 7/1990 | Stoof | 83/886 |
| D316,655 | S | | 5/1991 | Buday | |
| 5,036,740 | A | * | 8/1991 | Tsai | 83/455 |
| 5,201,264 | A | * | 4/1993 | Thelen et al. | 99/433 |
| 5,269,212 | A | * | 12/1993 | Peters et al. | 83/455 |
| 6,009,786 | A | | 1/2000 | Hjelden | |
| 6,182,549 | B1 | | 2/2001 | Albright et al. | |

FOREIGN PATENT DOCUMENTS

| | | | | |
|---|---|---|---|---|
| GB | 2339478 A | * | 1/2000 | G01B/3/56 |
| WO | WO 85/02988 | | 7/1985 | |

* cited by examiner

*Primary Examiner*—Allan N. Shoap
*Assistant Examiner*—John Windmuller
(74) *Attorney, Agent, or Firm*—Howard R Lambert

(57) ABSTRACT

A cake pan adapted for guidance in cutting a cake provides a pan bottom and a peripheral pan sidewall integral with the pan bottom and directed upwardly for terminating with a pan sidewall edge. The sidewall edge provids plural circular guide pins. A straightedge ruler has a straight edge of a length sufficient to span the cake pan from any one selected position on the sidewall edge to any further selected position on the sidewall edge. The guide pins are positioned such that with the straightedge ruler in contact with any selected pair of the guide pins, the straight edge is positioned for guiding straight-line cutting of the cake in a desired location on the cake corresponding to the straight edge.

7 Claims, 2 Drawing Sheets

APPARATUS FOR CUTTING BAKED GOODS AND METHOD OF USE

BACKGROUND OF THE INVENTION

1. Field of the Invention

This invention relates generally to devices for sectioning or cutting baked goods such as cakes while still within the pan in which they were baked, and more particularly to a cake pan or pan insert adapted for directing uniform and geometric cake cutting.

2. Description of Related Art

The following art defines the present state of this field:

Buday, U.S. Pat. No. Des. No. 316,655 describes a pizza pie cutter guide design.

Rexer, U.S. Pat. No. 892,552 describes a device comprising a rectangular frame, having a plurality of angle frames extending inwardly from its sides, spaced apart to form longitudinal and transverse guide slots, and supporting members carried by said frame.

Hulsmann, U.S. Pat. No. 2,434,566 describes a pastry slicing guide comprising a frame having a circular opening therein, a stationary slotted knife guiding member extending diametrically across the frame and secured thereto at both ends, a rotatable slotted knife guiding arm pivotally mounted on the knife guiding member at the center thereof, and cooperating means on the slotted arm and frame for locating the arm at equidistantly spaced places around the frame.

Gore, U.S. Pat. No. 2,487,234 describes a template for cutting pies and the like while mounted on its plate, said template being of inverted cup-shape with its top wall substantially parallel with the plate bottom and the side wall substantially normal thereto, said template being dimensioned internally to freely contain the pie and its plate when the plate and template are mounted on a common supporting surface, said template having its top wall formed with a central opening of definite dimensions and of less diameter than the width of the knife blade used in cutting the pie, said wall additionally having spaced slots radiating from said opening with each slot extending into the upper zone of the side wall to thereby permit the knife blade to traverse predetermined slots and maintain knife contact with the upper face and peripheral edge zone of the pie plate during the pie-cutting operations, the side wall zones of the slots extending below the plane of the peripheral edge of the pie plate to thereby assure the clean severance of the boundary crust of the pie in providing the cut.

Weaver, U.S. Pat. No. 3,075,565 describes an equal-share cutting guide, comprising; a base member provided with a centrally circularly apertured container supporting means positioned thereabove for receiving downwardly therethrough the central downwardly directed circular portion of a conventional circular container pan having an outwardly directed annular edge flange adapted to rest upon said supporting means immediately radially outside of the centrally aperatured portion of said supporting means; cutting template guide means removably mounted in vertically spaced position above said supporting means and including a plurality of circumferentially equally spaced radially directed pairs of closely adjacent knife-blade-guide members for guiding a knife blade extended downwardly therethrough for the purpose of cutting an object carried by the container therebelow into equal portions corresponding to the number of pairs of guide members; and spacing and positioning means carried at the top of said supporting means symmetrically around the centrally aperatured portion thereof and positionally cooperative with the annular edge flange of the container for positively centering it with respect to the supporting means and also effectively comprising vertical spacer means for said cutting template guild means.

Steketee, U.S. Pat. No. 3,132,678 describes a pie scorer capable of guiding cutting action for different Sized pie cuts using the same knife guide, comprising; annular upstanding support means for supporting the flange of a flanged pie pan, a segmental arcuate portion of said annular support means being cut away to cause a flange of a support pie plate to protrude to permit an operator to grasp the flange; a removable unidirectional knife guide extending in one direction across the diameter of said support means and held fixed with respect to and in spaced alignment with respect to said annular support means; said guide being held in a position displaced angularly from said out-away portion to allow easy grasp and movement of the pie pan flange and indicia fixedly positioned on said annular support means at a predetermined angular displacement from said knife guide means to indicate predetermined angles through which the pie pan is to be turned on said annular support means between cuts by grasping the pie pan flange at said cut-away portion to shift it.

Haapala, U.S. Pat. No. 3,727,508 describes a knock-down rectangular frame has two opposite sides with straight edges which serve as knife guides. Adjustable distance pieces at the ends of the frame sides predetermine the heights of the straight edges.

Hassenfelt, Jr., U.S. Pat. No. 4,648,300 describes a square frame surrounding and extending upwardly from a planar cutting surface to define a dough compartment. A plurality of vertical slots in each side wall extend from the top edge thereof down to the cutting surface to provide a guide for a cutting blade inserted therein. The slots are arranged in such a pattern that three, four, or six equal width slices may be formed in each direction depending on the slots selected for use. The cutter blade is accurately shaped along the bottom from end to end to ensure good contact with the cutting surface. An enlarged end portion at each end of the cutting blade prevents inadvertent dislodgement of the cutting blade during usage. A flour trough is provided on one side wall to facilitate the maintenance of a floured cutting blade during usage.

Hjelden, U.S. Pat. No. 6,009,786 describes a method and apparatus for quickly and easily cutting straight and uniform dessert bars is provided. The baker's cutting device consists of two parallel blocks connected perpendicularly by two parallel guide bars. The bottom of the front block is configured such that the block fits over one edge of the baking pan and the back edge of the block hangs over the edge of a table or counter top to hold the apparatus in place. The guide bars are in this manner suspended just over the top of a typical baking pan. Resting perpendicularly upon the guide bars is a sliding cutting bar, this cutting bar may be supplied with handles at each end. A plurality of cutting blades are attached to both the upper and lower sides of the cutting bar at various intervals.

Albright et al., U.S. Pat. No. 6,182,549 describes an apparatus for securing flat articles to be cut, including, in one embodiment, a base and a clamp bar coupled to the base by actuators. The actuators are slideably moveable to actuate the clamp bar between a clamping position near the base and an open position away from the base. A flat article is positioned between the clamp bar and the base, and the actuators are moved to position the clamp bar into the clamping position, securing the flat article to the base in a desired position for cutting. In an alternate embodiment, an apparatus includes a biasing member operatively engaged with the clamp bar to urge the clamp bar away from or toward the base. In another alternate embodiment, an apparatus includes a swing arm slideably coupled with the clamp bar, the swing arm having a straight edge. The swing arm projects away from the clamp bar and is slideably moveable across the base, thereby facilitating the securing of the flat and providing the straight edge for guiding a cutting device along a desired axis of cutting. In another embodiment, the swing arm includes pinch clamps that pinch and slideably engage the clamp bar, eliminating the need for maintaining precision tolerances between the clamp bar and the swing arm. In yet another alternate embodiment, the swing arm includes an angular adjustment assembly. In yet another alternate embodiment, an apparatus includes a cutting bar adjustably attached to the clamp bar. In yet another alternate embodiment, an apparatus includes a second clamp bar coupled to the base by second actuators, thereby allowing a flat article to be secured along two axes for cutting. In still another alternate embodiment, an apparatus includes a base having at least one channel disposed therein, a rail member engageable within the channel, a clamp bar, actuators and a swing arm. The swing arm is slideably coupleable with the clamp bar or with the rail.

Lacroix, WO 85/02988 describes a device intended to cut out equal portions from a round cake. It is comprised of an object having a plane or volumetric geometry and of which the basis is essentially circular. Said object is laid on the middle of a round cake and comprises markings and to indicate to the person who cuts the cake the cutting angle as a function of the number of portions to be made. The device which is the object of the invention is particularly intended to share out cakes or the like having a circular shape.

The prior art teaches the use of guides for cutting baked goods but does not teach a baking pan with upwardly directed round pins such that a straight edge ruler may be positioned at any angle against the pins for cutting geometric shapes in a cake. The prior art also does not teach a folding cake pan insert. The present invention fulfills these needs and provides further related advantages as described in the following summary.

SUMMARY OF THE INVENTION

The present invention teaches certain benefits in construction and use which give rise to the objectives described below.

A cake pan is adapted for guidance in cutting a cake and provides a pan bottom and a peripheral pan sidewall integral with the pan bottom and directed upwardly and terminating with a pan sidewall edge. The sidewall edge provides plural circular guide pins. A straightedge ruler has a straight edge of a length sufficient to span the cake pan from any one selected position on the sidewall edge to any further selected position on the sidewall edge. The guide pins are positioned such that with the straightedge ruler in contact with any selected pair of the guide pins, the straight edge is positioned for guiding straight-line cutting of the cake in a desired location on the cake corresponding to the straight edge. In a further embodiment of the invention an insert fits on the edge of the cake pan and provides the guide pins. The insert is fitted for folding flat for storage.

A primary objective of the present invention is to provide an apparatus and method of use of such apparatus that provides advantages not taught by the prior art.

Another objective is to provide such an invention capable of guiding the cutting of a cake.

A further objective is to provide such an invention capable of cutting the cake into geometric shapes.

A still further objective is to provide such an invention capable of being folded flat for storage.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
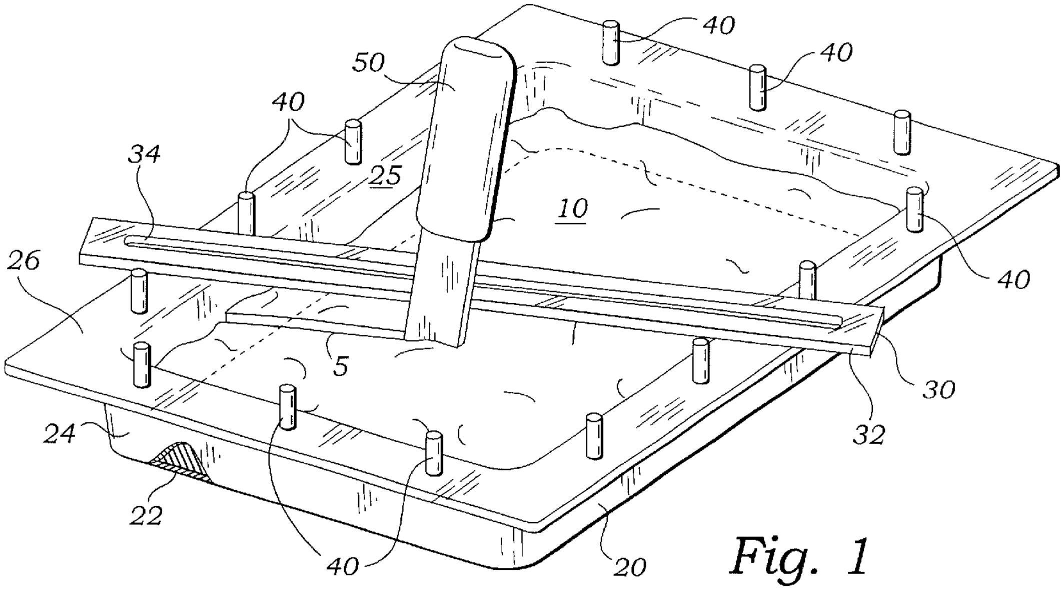
FIG. 1 is a perspective view of a cake pan of the preferred embodiment of the invention.

The present invention is an apparatus for directing the cutting of a cake 19, or similar baked goods, along a plurality of straight lines. Plural cuts may be made to section the cake 10 as desired. A first embodiment of the invention is a combination of a cake pan 20, which may be made of metal, plastic, glad or similar materials, and a straightedge ruler 30 made of a rigid material- The pan 20 is adapted for containing the cake 10 during baking in that it has a pan bottom 22 and a peripheral pan sidewall 24 integral with the pan bottom 22 and directed upwardly therefrom and terminating with a pan sidewall edge 26 as shown in FIG. 1. FIG. 1 depicts a rectangular cake pan 20, but it may be any shape including round, square, triangular, etc. The sidewall edge 26 provides plural guide pins 40 engaged therewith and which extend vertically upwardly therefrom. The guide pins 40 each have a preferably circular cross-section for specific reasons to be discussed. The straightedge ruler 30 has a straight edge 32 of a length sufficient to span the pan 20 from any one selected position on the sidewall edge 26 to any further selected position on the sidewall edge 26 so that cuts may be made laterally, longitudinally and diagonally within the cake pan 20. Linear indicia are positioned on the pan bottom indicating plural possible cake cuts. The straightedge ruler 30 is preferably of a transparent material, such as acrylic plastic, for improved visibility in drawing cuts in the cake 10.

The guide pins 40 are positioned such that with the straightedge ruler 30 engaged with any selected pair of the guide pins 40, the straight edge 30 is positioned for guiding straight-line cutting of the cake 10 in a desired location 5 on the cake 10 corresponding with the position of the straight edge 32. Clearly, the pins 40 may be placed so as to cut square, rectangular, triangular and diamond shaped portions of the cake 10. Other shapes are not excluded from the capability of the present invention. Preferably, the straightedge 32 is sufficiently wide so that a cutting implement 50 may be maintained in a vertical orientation by strongly pressing it against the straightedge 32 as it is drawn along.

Preferably, the straightedge ruler 30 provides a longitudinal slot 34 for engaging the guide pins 40. In this manner the slot 34 may be engaged with the pins 40 so that the slot 34 is aligned with the center of the pins 40 and the cutting implement 50, for instance a knife, may be inserted into the slot 34 and drawn across the cake accurately aligned with the center of the pins 40. Another advantage of the slot 34 in the ruler 30 is that the ruler 30 may be directed in any direction desired to make longitudinal, lateral or diagonal cuts without loss of precision. This enables the cake 10 to be cut with improved symmetry and uniformity of the finished cake pieces. The fact that the pins 40 are round in section enables the ruler 30 to be swiveled in any direction with the ruler slot 34 pivoting about any one of the guide pins 40.

Figure 2:
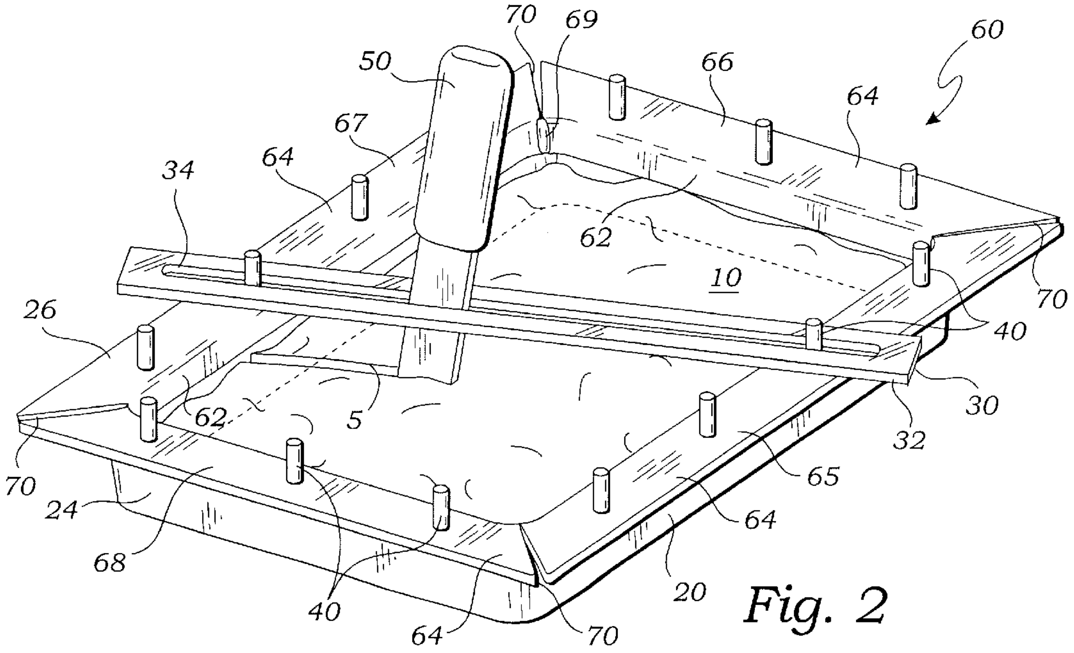
FIG. 2 is a perspective view of a cake pan insert in a cake pan, as a further preferred embodiment of the invention.

In a further embodiment of the invention, preferably made of plastic by an injection molding process, well known in the art, for use when a cake pan 20 does not provide the guide pins 40, the guide pins 40 are mounted on a cake pan insert 60 having a continuous inner lip 62, shown in FIG. 2, adapted for peripheral engagement with an inner surface 25 of the cake pan sidewall 24, and a continuous outer lip 64, integral with the inner lip 62, and positioned for resting on the sidewall edge 26 of the sidewall 24.

Figure 4:
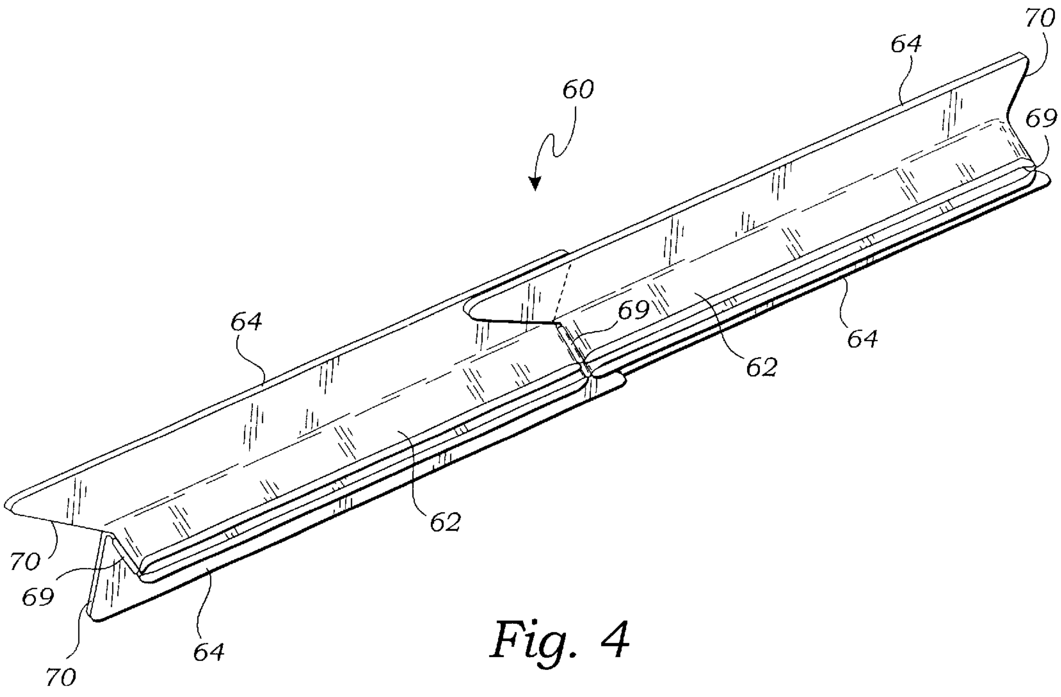
FIG. 4 is a perspective view of the further embodiment shown folded for storage.

In the case where the pan insert 60 is rectangular in shape, as shown in FIG. 2, it is made up of four straight portions 65, 66, 67, and 68 joined end-to-end. These engage the rectangular cake pan 20. Each pair of the straight portions is joined by a hinge 69, preferably a, so-called living hinge, comprised of a thin portion of the plastic formed as a flexible web, whereby the pan insert 60 may be folded relatively flat for storage when not in use as shown in FIG. 4. In this case, the hinge 69 joins the inner lip 62 of adjacent straight portions, while the corresponding outer lips 64 are separated by a slit 70.

Figure 3:
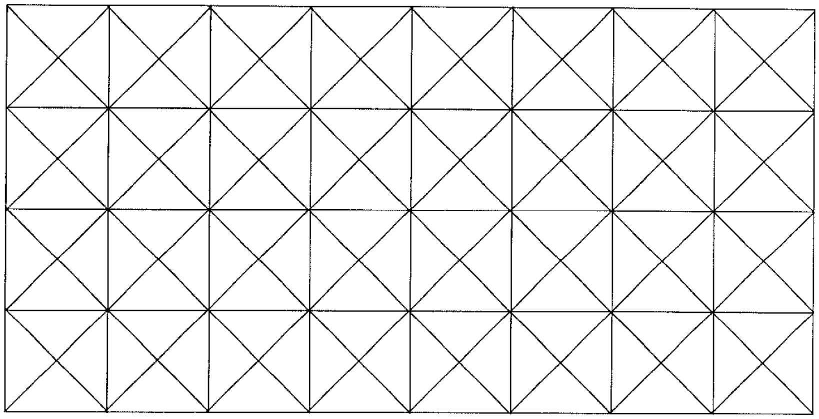
FIG. 3 is a plan view of a cake showing a plurality of cuts enabled by the invention.

The method of use of the present invention for cutting a cake comprises the steps of placing an inner lip 62 of the cutting guide insert 60 against the inner surface 25 of the cake pan 20, resting the outer lip 64 of the cutting guide insert 60 on the edge 26 of the cake pan 20, placing the straightedge ruler 30 into contact with a selected pair of the guide pins 40 and preferably with the guide pins inserted in the slot 34 of the ruler 30, and then drawing a cutting implement 50 along the straightedge ruler 30, preferably in the slot 34, to cut the cake 10. This same procedure is repeated until the cake 10 is sectioned in accordance with plan, with some of the possibilities shown in FIG. 3. The method further comprising the step of folding the cutting guide 40 for storage as shown in FIG. 4.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus for directing the cutting or a cake, the apparatus comprising: a cake pan containing a cake, said cake pan having a sidewall with a sidewall upper edge, a pan insert having a continuous lip positioned for resting on the upper edge of the sidewall, the lip providing plural guide pins engaged therewith and extending vertically upwardly therefrom, a straightedge ruler having a straight edge of a length sufficient to span the pan insert from any one selected position thereon to any further selected position; the guide pins being positioned such that with the straightedge ruler in contact with at least one selected pair of opposing ones of the guide pins, the straight edge is positioned for guiding straight-line cutting of the cake in a desired location on the cake corresponding with the straight edge.

2. An apparatus for directing the cutting of a cake, the apparatus comprising:

a. a rectangular cake pan having a sidewall with an inner surface and a sidewall upper edge, and containing a cake;

b. an insert having a continuous inner lip adapted for peripheral engagement with the inner surface of the cake pan sidewall, and a continuous outer lip, integral with the inner lip, the outer lip positioned for resting on the sidewall upper edge of the pan, the outer lip providing plural guide pins engaged therewith and extending vertically upwardly therefrom, the pan insert being rectangular in shape providing four straight portions joined end-to-end for engaging the cake pan, adjacent ones of the straight portions being joined with a hinge whereby the pan insert may be folded for storage; and c. a straightedge ruler having a length sufficient to span the bake pan insert from any one selected position thereon to any further selected position thereon, the insert guide pins being positioned such that with the straightedge ruler in contact with at least one selected pair of opposing ones of the guide pins the straightedge ruler is positioned for guiding straight-line cutting of said cake in a desired location on the cake corresponding with the straight edge.

3. The apparatus of claim 2 wherein the pins are positioned for cutting square-shaped portions of the cake.

4. The apparatus of claim 2 wherein the pins are positioned for cutting rectangular-shaped portions of the cake.

5. The apparatus of claim 2 wherein the pins are positioned for cutting triangular-shaped portions of the cake.

6. The apparatus of claim 2 wherein the pins are positioned for cutting diamond-shaped portions of the cake.

7. An apparatus for directing the cutting of a cake, the apparatus comprising:

a. a pan having a continuous sidewall with an upper edge, and containing baked goods;

b. a straightedge having a length sufficient to span said pan sidewall upper edge in any direction; and c. a baked goods cutting insert having a continuous lip configured for fitting onto, and extending around, said pan sidewall upper edge, said lip having a plurality of spaced-apart guide pins which extend vertically upwardly from said lip and around said lip, said guide pins being positioned such that with the straightedge in contact with any selected pair of opposing ones of the guide pins, the straightedge is positioned for guiding straight-line cutting of the baked goods contained in said pan in a desired pattern selected from square, rectangular, triangular and diamond patterns.

* * * * *